US009385449B2

(12) United States Patent
Peters et al.

(10) Patent No.: US 9,385,449 B2
(45) **Date of Patent: *Jul. 5, 2016**

(54) TERMINAL/CONNECTOR HAVING INTEGRAL OXIDE BREAKER ELEMENT

(71) Applicant: Carlisle Interconnect Technologies, Inc., Saint Augustine, FL (US)

(72) Inventors: Kenneth J. Peters, St. Augustine, FL (US); William L. Arenburg, St. Augustine, FL (US)

(73) Assignee: Carlisle Interconnect Technologies, Inc., Saint Augustine, FL (US)

(*) Notice: Subject to any disclaimer, the term of this patent is extended or adjusted under 35 U.S.C. 154(b) by 72 days.

This patent is subject to a terminal disclaimer.

(21) Appl. No.: 14/010,073

(22) Filed: Aug. 26, 2013

(65) Prior Publication Data

US 2013/0344723 A1 Dec. 26, 2013

Related U.S. Application Data

(63) Continuation-in-part of application No. 12/371,765, filed on Feb. 16, 2009, now Pat. No. 8,519,267.

(51) Int. Cl.
*H02G 15/02* (2006.01)
*H01R 11/12* (2006.01)
(Continued)

(52) U.S. Cl.
CPC ................ *H01R 11/12* (2013.01); *H01R 4/203* (2013.01); *H01R 4/62* (2013.01)

(58) Field of Classification Search
CPC ............ H01R 4/18; H01R 4/00; H01R 11/12; H01R 11/20; H01R 13/56; H01R 4/203; H01R 4/62; H01R 43/00; H02G 3/06; H02G 15/10
USPC .... 174/76, 74 A, 74 R, 77 R, 80, 84 C, 84 R, 174/87, 88 R; 439/445, 275, 877, 882; 29/871, 825, 854, 857, 862, 863, 869, 29/873
See application file for complete search history.

(56) References Cited

U.S. PATENT DOCUMENTS 2,480,280 A * 8/1949 Bergan .................. H01R 4/203 219/118
2,799,721 A * 7/1957 Floyd, Jr. .................... 174/94 R
(Continued)

FOREIGN PATENT DOCUMENTS

DE 1465155 A1 12/1968
DE 9215578 U1 12/1992
(Continued)

OTHER PUBLICATIONS

Installation Instruction 400LR Feb. 1995.*
(Continued)

*Primary Examiner* — Timothy Thompson
*Assistant Examiner* — Guillermo Egoavil
(74) *Attorney, Agent, or Firm* — Wood, Herron & Evans, LLP

(57) ABSTRACT

A one piece integral electrical terminal has a mount portion and a wire receiving portion. The wire receiving portion has a continuous annular interior wall having a contact portion with an integral oxide breaker especially suited to breaking through the oxide layer on aluminum wire. The wire receiving portion also has a sealing portion with at least one integral seal ring. An electrical cable is made by crimping the electrical terminal to an aluminum wire using a modified hexagonal crimp.

21 Claims, 14 Drawing Sheets

(51) Int. Cl.
*H01R 4/20* (2006.01)
*H01R 4/62* (2006.01)

(56) References Cited

U.S. PATENT DOCUMENTS

| | | | | | |
|---|---|---|---|---|---|
| 2,974,400 | A | | 3/1961 | Sowa | |
| 3,633,153 | A | | 1/1972 | Ahmed | |
| 3,695,642 | A | | 10/1972 | DeWoody | |
| 3,717,839 | A | | 2/1973 | Aldridge | |
| 3,732,718 | A | | 5/1973 | Barberio et al. | |
| 3,757,031 | A | | 9/1973 | Izraeli | |
| 3,831,132 | A | * | 8/1974 | Bowden et al. | 439/442 |
| 3,895,851 | A | * | 7/1975 | Bolton | H01R 4/62 174/84 C |
| 3,955,044 | A | | 5/1976 | Hoffman et al. | |
| 4,150,866 | A | * | 4/1979 | Snyder, Jr. | H01R 13/5205 29/887 |
| 4,388,523 | A | * | 6/1983 | Keep, Jr. | H05B 3/06 174/77 R |
| 4,611,872 | A | * | 9/1986 | Ito | H01R 13/5219 439/277 |
| 4,828,516 | A | | 5/1989 | Shaffer | |
| 4,861,290 | A | * | 8/1989 | Halmstad et al. | 439/810 |
| 5,422,438 | A | * | 6/1995 | Lamome | 174/84 C |
| 5,499,448 | A | * | 3/1996 | Tournier | H01R 4/183 29/862 |
| 5,499,934 | A | | 3/1996 | Jacobsen et al. | |
| 5,514,836 | A | | 5/1996 | Delalle et al. | |
| 6,025,559 | A | * | 2/2000 | Simmons | H01R 4/22 174/87 |
| 6,415,499 | B1 | | 7/2002 | Holland et al. | |
| 6,658,725 | B1 | | 12/2003 | Liu | |
| 6,836,620 | B1 | | 12/2004 | Bischoff | |
| 7,210,958 | B1 | | 5/2007 | Jacques et al. | |
| 7,256,348 | B1 | * | 8/2007 | Endacott | H01R 4/183 174/84 C |
| 7,264,503 | B2 | | 9/2007 | Montena | |
| 7,494,388 | B2 | | 2/2009 | Kakuta | |
| 7,786,383 | B2 | | 8/2010 | Gumley | |
| 8,066,525 | B2 | | 11/2011 | Melni | |
| 8,519,267 | B2 | | 8/2013 | Peters et al. | |
| 2002/0066588 | A1 | * | 6/2002 | King, Jr. | 174/87 |
| 2008/0217055 | A1 | * | 9/2008 | Gumley | H01R 4/206 174/84 C |
| 2008/0307934 | A1 | | 12/2008 | Coe | |
| 2010/0147585 | A1 | * | 6/2010 | Kobayashi | H01R 4/186 174/84 C |
| 2012/0252258 | A1 | * | 10/2012 | Solon | 439/445 |

FOREIGN PATENT DOCUMENTS

| | | | |
|---|---|---|---|
| DE | 19821630 | C1 | 9/1999 |
| EP | 1395464 | A1 | 3/2004 |

OTHER PUBLICATIONS

Five-page International Search Report mailed Nov. 6, 2014 for counterpart PCT Application PCT/US2014/052482.

Seven-page Written Opinion mailed Nov. 6, 2014 for counterpart PCT Application PCT/US2014/052482.

* cited by examiner

TERMINAL/CONNECTOR HAVING INTEGRAL OXIDE BREAKER ELEMENT

RELATED APPLICATIONS

This Application is a Continuation-in-Part of pending U.S. patent application Ser. No. 12/371,765, filed Feb. 16, 2009, entitled "TERMINAL HAVING INTEGRAL OXIDE BREAKER", which pending application is incorporated herein by reference in its entirety.

FIELD OF THE INVENTION

This present invention relates generally to electrical connectors, and particularly to improving the performance, construction and ease of use of connectors on aluminum wire.

BACKGROUND OF THE INVENTION

Electrical wires are most often made with copper or aluminum conductors. These may be of one solid piece, or stranded. For ease of connections, for instance to grounding studs, or to power strips, a lug or terminal is often attached to the end of the wire. The terms lug, terminal lug, and terminal will be used interchangeably in this application. A wire with a terminal is also referred to as a "cable" herein. A cable might also incorporate multiple electrical conductors or wires that are connected or spliced together end-to-end. The cable, including the interface between the terminal and the conductor or between adjacent conductors, must efficiently conduct the electricity that the cable is meant to carry. If the conductance at the interface is not efficient (if resistance is high), the cable may not perform the function for which it is intended, or it may overheat. Usually, the terminal mechanically fastens to the aluminum or copper conductor. If there is insulation on the wire, it is first removed or penetrated in an area sufficient to allow proper electrical contact which is usually metal-to-metal contact. Sometimes attachment occurs with a heat process such as welding or soldering, however these tend to be slower methods than mechanical fastening. Also, the heat of these processes could deteriorate the properties of the nearby insulation that is on the conductor. Mechanical crimping of a terminal around a wire is commonly used. However, the chemistry of aluminum oxidation makes crimping to an aluminum wire more difficult than to a copper wire, as will be explained.

It is known that aluminum resists corrosion (oxidation) better than steel does. For example, lawn furniture made of steel develops flaking rust (oxidation) but aluminum furniture does not. Aluminum also oxidizes almost instantaneously when exposed to air, but the oxide does not subsequently flake off. Instead, the oxidized surface layer is very thin and very strong. It protects the nonoxidized aluminum below by separating it from the surrounding air. This property of aluminum presents a problem in the manufacture of aluminum cables because the oxide layer is a poor conductor of electricity. Thus, one consideration in aluminum cable manufacture is how to get good electrical conductivity between a terminal and an aluminum wire or between the transition spanning between two coupled or spliced sections of wire. Preferably, good electrical conductivity is achieved in a cost effective manner that has a low opportunity for problems to arise during the manufacturing process.

Another consideration in cable manufacture is how to create a cable that resists moisture and air infiltration between the terminal and the conductor or at the transition between two spliced wires. In many cases this means making an airtight connection between the terminal or transition and the exterior of the wire insulation.

Still another consideration in cable manufacture is how to provide a terminal/cable combination that has a consistent and strong geometry. Preferably the terminal and cable are straight and smooth to avoid stress concentrations. With stranded wire, severing one or more strands during the terminal attachment process should also be avoided.

There have been many attempts at making a terminal for use with Aluminum wire. For example, U.S. Pat. No. 3,955,044 to Hoffman et al., issued May 4, 1976 shows one such prior art. FIGS. 1-3 in the present application are representative of a prior art configuration showing some drawbacks to the prior art. A tin plated copper terminal 10 includes a ring tongue (RT) style connector portion 11, a cylindrical wire barrel 12, a perforated liner 14, and an annular ring 16 with an inclined wall 18. Terminal 10 is shown in exploded view with stranded aluminum wire 20 having conductor strands 22, an insulating sheath 24, and an abrasion sheath 26. FIGS. 2 and 3 show the wire 20 installed in the terminal 10, before and after crimping by die set 27. In FIG. 3, the deformation, known as terminal skew, of the terminal 10 is extensive, with the upper mounting surface 28 and lower mounting surface 30 no longer parallel to the axis 32 of the wire 20. Also, with such a design several conductor strands 22 might be severed as shown at 34 in the area of annular ring 16. The pre-crimp geometry of FIG. 2 is represented with phantom lines in FIG. 3. The extensive extrusion and crimping of the conductor strands 22 and barrel 12 changes the length 36 and the angle 38 an amount that is significant and not precisely predictable.

There are many drawbacks to the prior art, including, but not limited to the multiple pieces that are required and that lead to increased cost and opportunity for assembly errors, severing of one or more strands, and the non-linear alignment between the connector portion and the wire barrel after crimping. The present invention addresses these drawbacks and other drawbacks in the prior art.

SUMMARY OF THE INVENTION

An electrical component for use with wires, such as aluminum or copper wire, might be in the form of a terminal or connector. The terminal has a mount portion, for connecting to a part of an electric circuit, and a wire receiving portion. The connector implements adjacent wire receiving portions to receive the ends of wires that are connected together. The wire receiving portions have an interior with a contact portion that has an oxide breaker element. The wire receiving portion may also have a sealing portion that has at least one integral seal ring for sealing with the insulator of a wire.

The integral oxide breaker element may have tapered protrusions with a coating. In one embodiment the coating is nickel, but may be other suitable materials. The wire receiving portion accepts a wire, such as aluminum or copper wire to make a cable, and upon crimping of the receiving portion the oxide breaker element makes electrical contact with conductor(s) of the wire.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 4:
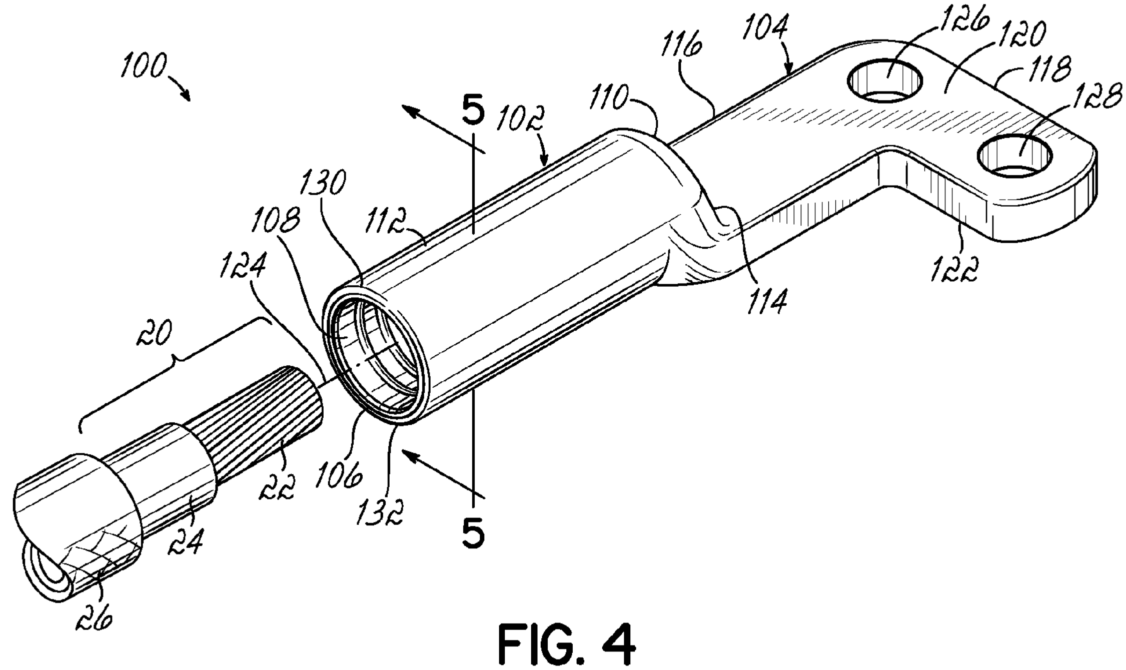
FIG. 4 illustrates one embodiment of the current invention with a stranded wire prior to installation.

With reference to FIG. 4, in one embodiment of the invention, an integral electrical terminal 100, includes a body made from a solid piece of 1100 Aluminum per ASTM B221, and has a wire receiving portion 102 and a mount portion 104, and is shown with a stranded aluminum wire 20 having a conductor with conductor strands 22, an insulating sheath 24. Although aluminum wire might be used in one embodiment of the invention, the conductor of the wire might be made of other suitable electrically conducting material, such as copper. In one embodiment, the wire connected with the terminal may also include an abrasion sheath 26. The receiving portion 102 of the terminal body has a front face 106 surrounding an aperture 108, a back face 110, and an outer wall 112 between the front face 106 and the back face 110. The receiving portion 102 is cylindrical, consistent with the usual cylindrical shape of wire, although the receiving portion 102 may be a variety of shapes. Between the back face 110 and the mount portion 104 is a transition radius 114. The mount portion has a parallel leg 116 and a perpendicular leg 118 coming from the end of the parallel leg 116 opposite the receiving portion 102. This terminal 100 is in the shape of what is known in the industry as a CRN terminal, however the mount portion 104 may be a variety of shapes. If the mount portion 104 had only the parallel leg 116, it would be an RT (Ring Tongue) configuration. A top face 120 and a bottom face 122 are approximately parallel to an axis 124 of the receiving portion 102. Hole 126 and a second hole 128 pass through the mount portion 104 from the top face 120 to the bottom face 122. The receiving portion 102 has a top 130 and a bottom 132, as determined by the orientation of the top face 120 and bottom face 122.

Figure 5:
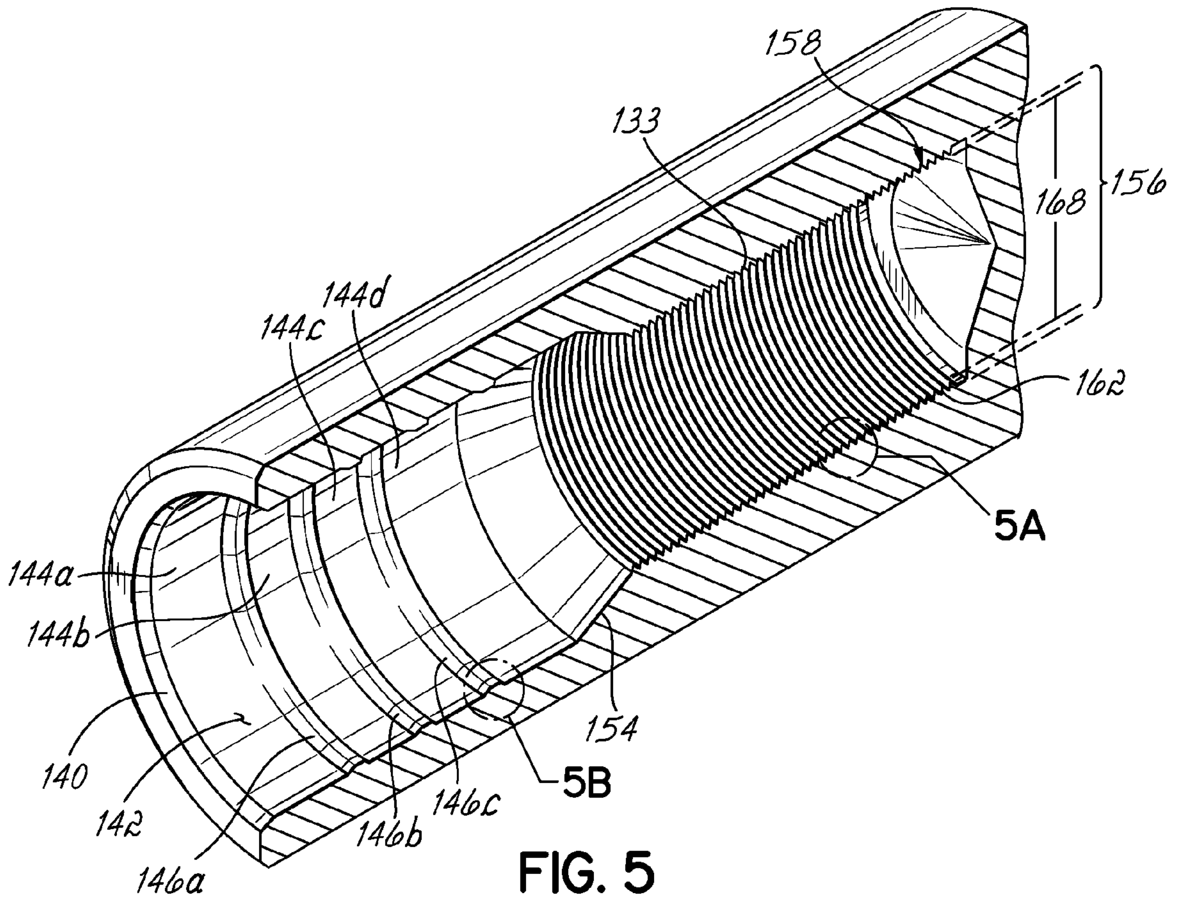
FIG. 5 is a partial cross-section of the embodiment, as indicated in FIG. 4.
Figure 8:
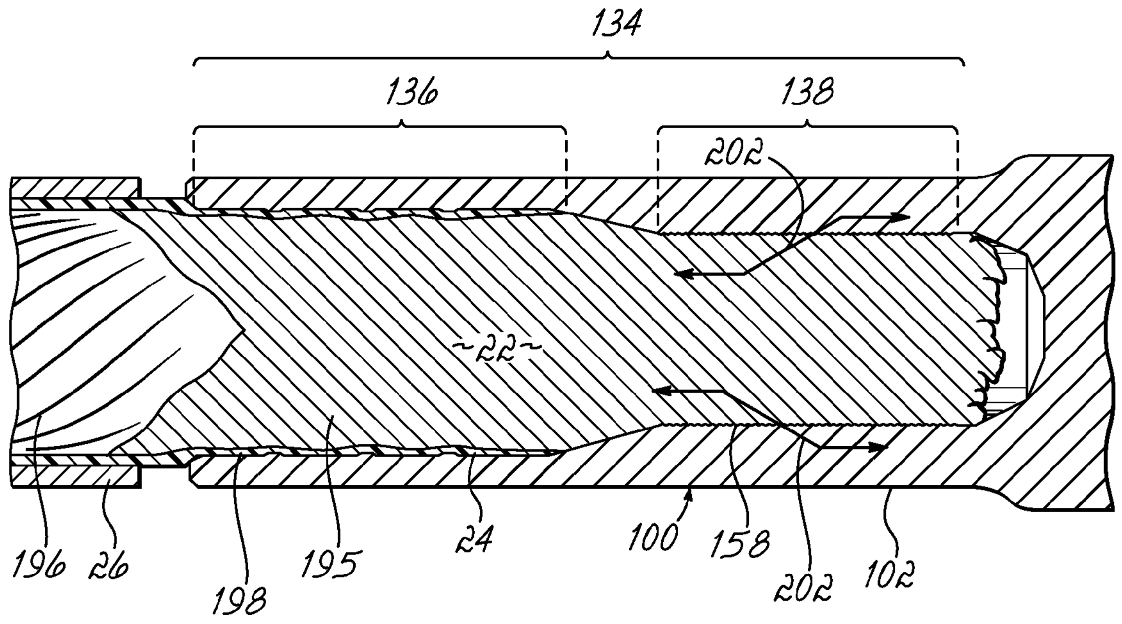
FIG. 8 is a cross-section of the embodiment, as indicated in FIG. 7.
Figure 9:
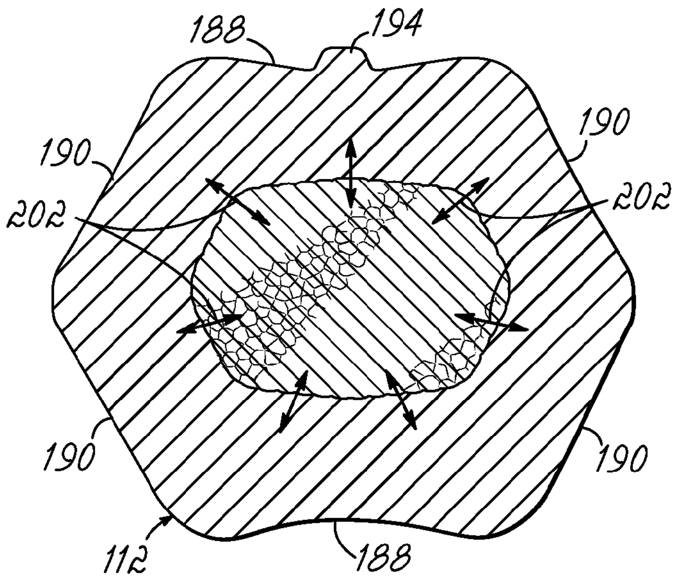
FIG. 9 is another cross-section of the embodiment, as indicated in FIG. 7.

With reference to FIGS. 4, 5, and 8, the wire receiving portion 102 is configured to be crimped, and has continuous annular interior wall 133 comprising a crimp portion 134 (FIG. 8) that comprises a seal portion or sealing portion 136 and a contact portion 138. The sealing portion 136 is adjacent to, and spaced from, the contact portion 138 toward aperture 108. A chamfer or radius 140 at the front face 106 connects with a seal zone surface 142. In one embodiment, the seal zone surface 142 is broken into four areas 144*a, b, c, d* by three integral seal rings 146*a, b, c* protruding radially inward from the seal zone surface 142. In this embodiment the four areas 144*a, b, c, d* all measure substantially the same diameter, however in other embodiments the diameters may be different. Similarly, the seal rings 146*a, b, c*, having a smaller diameter than the diameter of the four areas 144*a, b, c, d*, all measure substantially the same diameter, however in other embodiments the diameters may be different. It is also contemplated that there may be more than or fewer than the three illustrated seal rings. Each seal ring 146 has a face 148 (FIG. 5B) of a particular width, with a front angled wall 150 and a back angled wall 152 leading to the adjacent one of the four areas 144. In this embodiment, all the angled walls 150, 152 are the same angle, however, in other embodiments the angles may be different, or may be a positive or a negative radius.

An integral funnel 154 is between the seal or sealing portion 136 and the contact portion 138. The integral funnel 154 guides the conductor strands 22 from the larger seal portion 136 into the contact portion 138, while the wire 20 is being inserted into the terminal 100.

The contact portion 138 has a continuous cylindrical wall 155 with a major diameter 156 and an integral oxide breaker or oxide breaker element 158, the term this application will use for the macro object that breaks through the oxide layer on the conductor or conductor strands 22 when the wire receiving portion is crimped.

The integral oxide breaker element 158 comprises a plurality of protrusions, such as tapered protrusions 162, extending radially inward from the major diameter 156 of the contact portion 138. The protrusions are configured to engage the conductor of a wire positioned in the contact portion, and to protrude into the wire when the wire receiving portion is crimped. These tapered protrusions 162 may be separate from each other, but in other embodiments, for ease of manufacture, these tapered protrusions 162 are in the form of a helical thread 164 (FIG. 5A) that is conveniently manufactured on metal cutting or forming equipment. In one embodiment the thread 164 has a sixty degree included angle 166 and a pitch 167 of eighty, and is 0.008/0.010 inch deep. A pitch 167 of sixty has also worked successfully. It is contemplated that other included angles 166 and pitch 167 combinations as well as depths would also work. A minor diameter 168 of the threads equal to 0.481+/−0.002 inch has been used for wire gauge 2/0. The oxide breaker 158 further comprises a coating 170 on the protrusions 162. In various embodiments, the oxide breaker and the structures forming same might be coated with a material layer or left uncoated. In one particular embodiment, the coating 170 is an electroless nickel plate of 0.0005+/−0.002 per ASTM B733 Type III. This may be successfully put in the blind hole (blind refers to a hole with only one aperture 108) by using an appropriate coating process. In addition to nickel, other coatings might be utilized and include electro nickel, gold, silver, tin and tin-lead, and alkaline-bismuth-tin.

The structure of the oxide breaker element provides not only the ability to break through the oxide layer on the conductor strand, but also improves the electrical and mechanical features of the invention. For example, electrically, the construction of the oxide breaker element increases the surface area of the crimp, and the contact with the conductor, to improve the overall electrical properties of the connection in the transition from the wire to the terminal. Furthermore, the oxide breaker element 158 increases the grip function at the contact portion 138, and increases the pull force necessary to remove the wire 20 from terminal 100.

Figure 10:
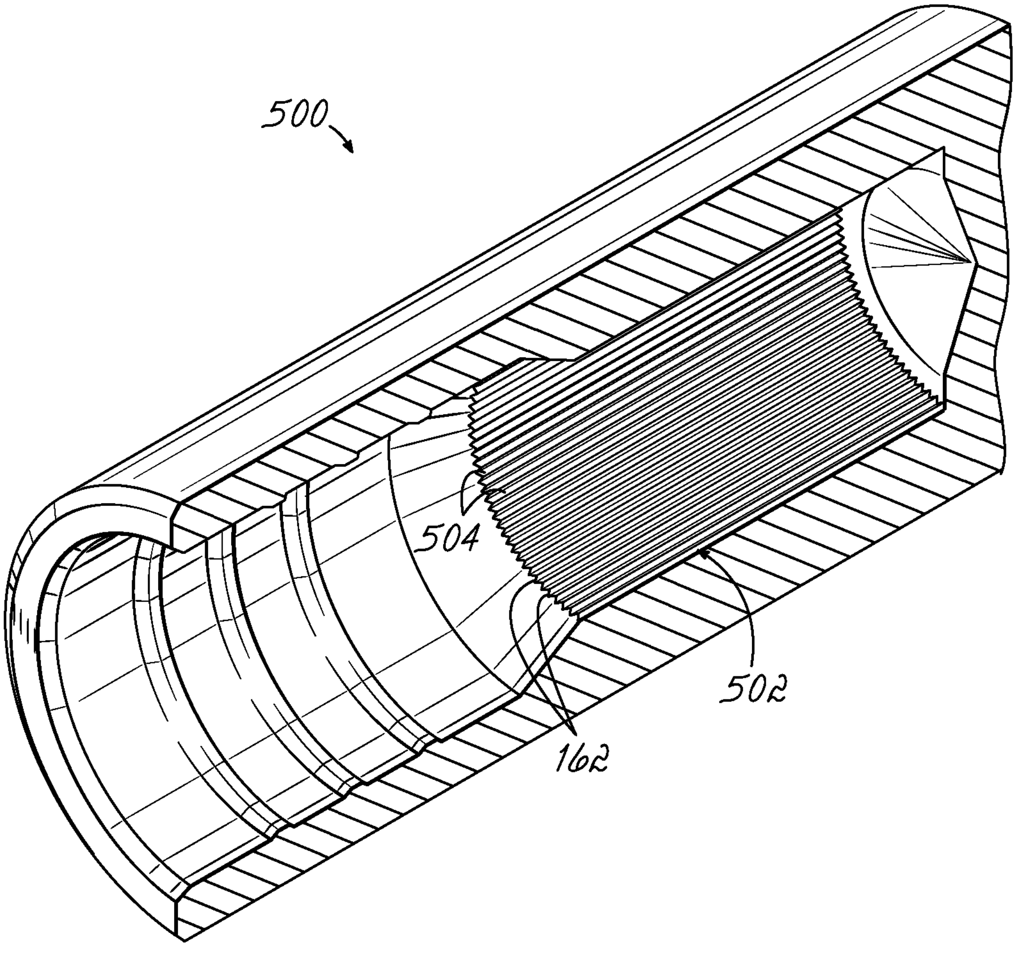
FIG. 10 is a partial cross-section illustrating an alternative embodiment of the current invention.

It is also contemplated that other forms of structures or elements might be used for the oxide breaker element 158, for example discrete annular protrusions might also be used. The making of one or more spiral threads is a widely perfected and efficient process. FIG. 10 illustrates an alternative embodiment of a contemplated terminal 500 in which the protrusions 162 of the oxide breaker 502 are axial ridges 504. The orientation of the axial ridges 504 are parallel to the direction of pull-out. Thus, while the protrusions 162 improve upon the prior art and provide improved electrical properties for current conductance purposes, they might be slightly less effective in improving pull-out requirements as those illustrated in FIG. 5. In both embodiments 100, 500, these protrusions 162 comprise peaks 172, angular faces 174, and bottoms 176, and may have no coating, or may be covered by coating 170 as seen in detail FIG. 5A. Other embodiments of protrusions 162 are contemplated but not shown, for example, a plurality of spikes rising from the major diameter 156 might also be implemented.

Figure 1:
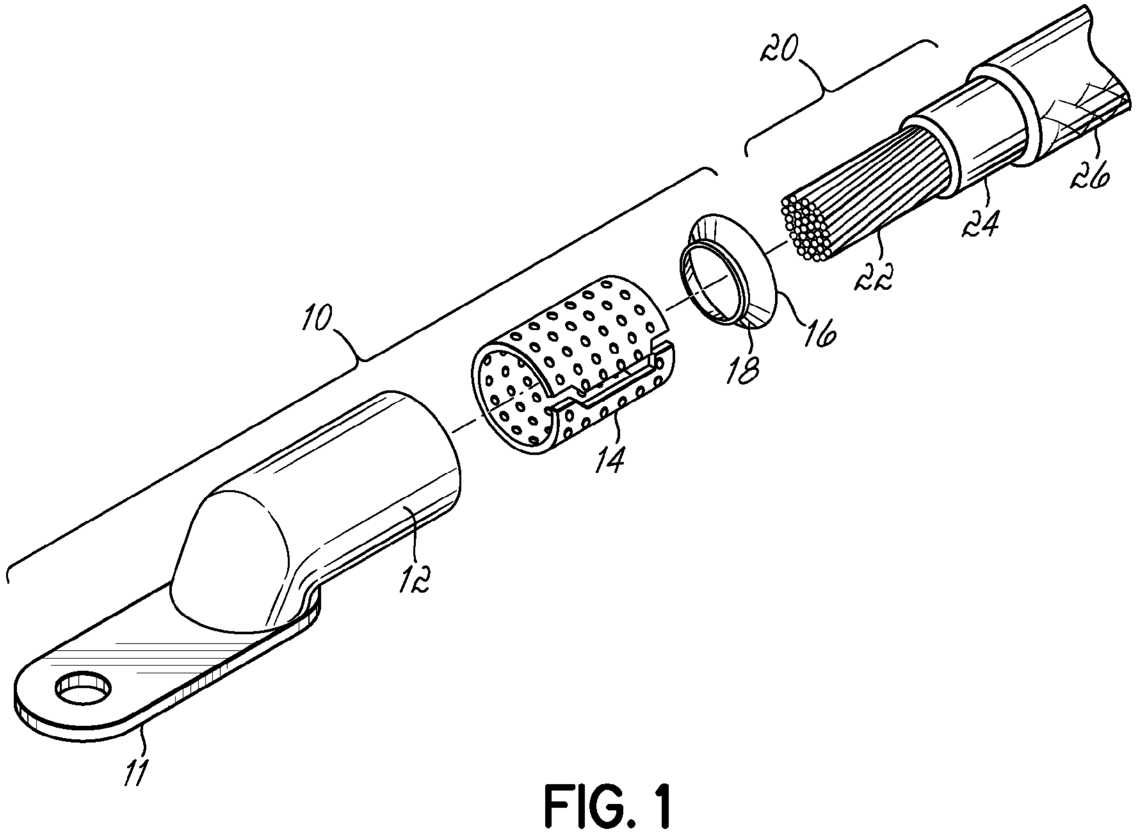
FIG. 1 PRIOR ART
FIG. 1 is an exploded view of a terminal of the prior art, with a wire.
Figure 2:
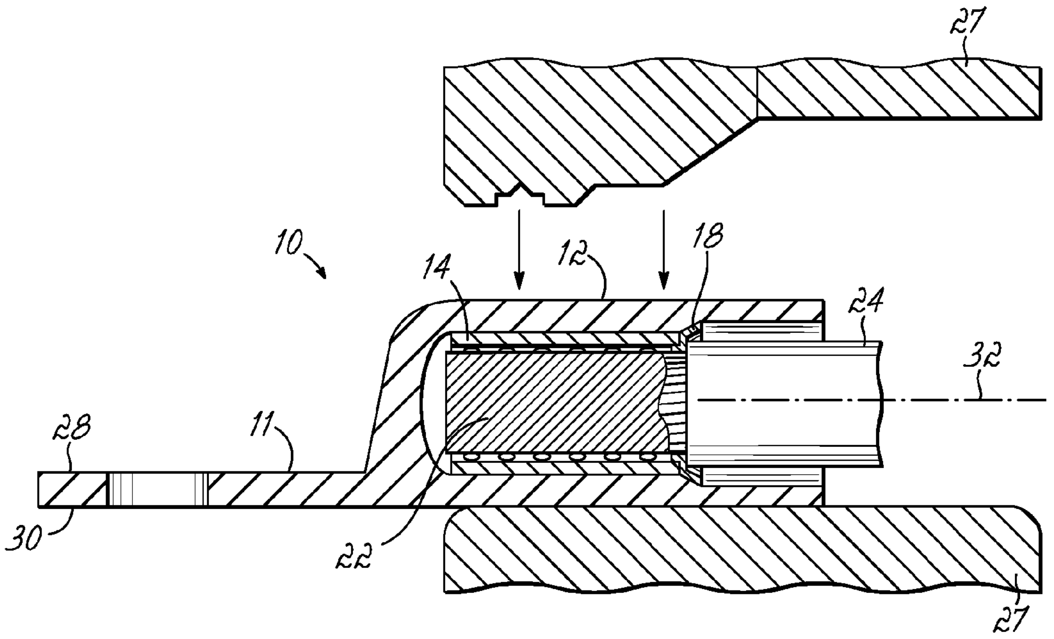
FIG. 2 PRIOR ART
FIG. 2 is an assembled view of FIG. 1 prior to crimping, and is also prior art.
Figure 3:
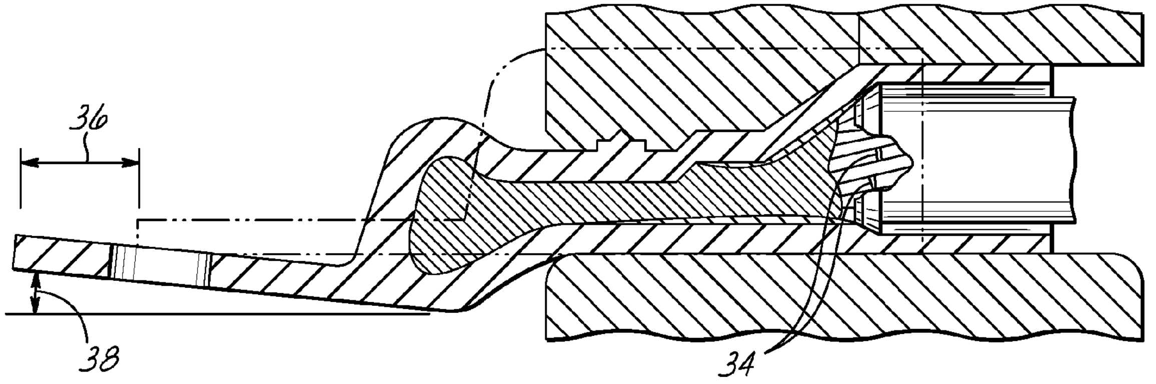
FIG. 3 PRIOR ART
FIG. 3 is an assembled view of FIG. 1 after crimping, and is also prior art.
Figure 6:
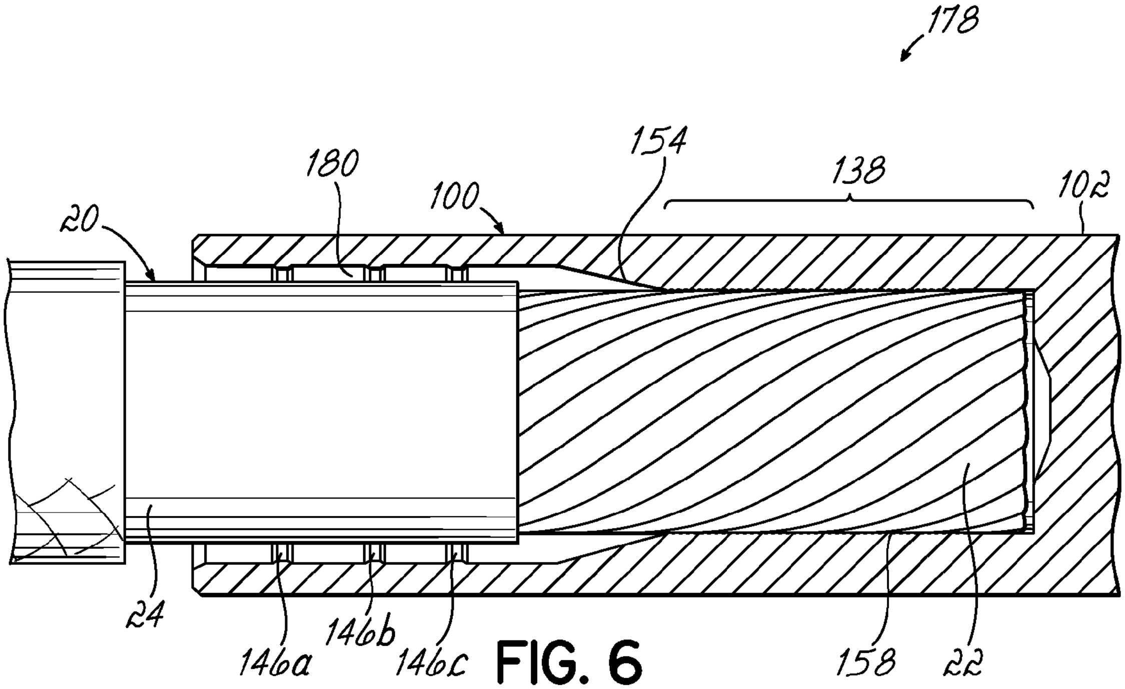
FIG. 6 illustrates a not cross-sectioned wire slid into a cross-sectioned embodiment of FIG. 4 for illustrative purposes.

In use to make an assembly 178 (FIG. 6), the wire 20 is inserted in the terminal so that the conductor or conductor strands 22 are guided by the integral funnel 154 into the contact portion 138. The three seal rings 146*a,b,c* surround the insulation sheath 24, and the integral oxide breaker 158 surrounds the conductor of the wire, including the conductor strands 22. There is a clearance space 180 between the terminal 100 and the wire 20. Assembly only requires the electrical terminal and the wire, thus it is far easier than stocking, handling, and properly orienting multiple pieces as shown in FIG. 1. There is not a concern that an internal piece may be left out, installed backwards, or installed incorrectly. Costs are reduced for at least component manufacturing and stocking, and for assembly.

Figure 7:
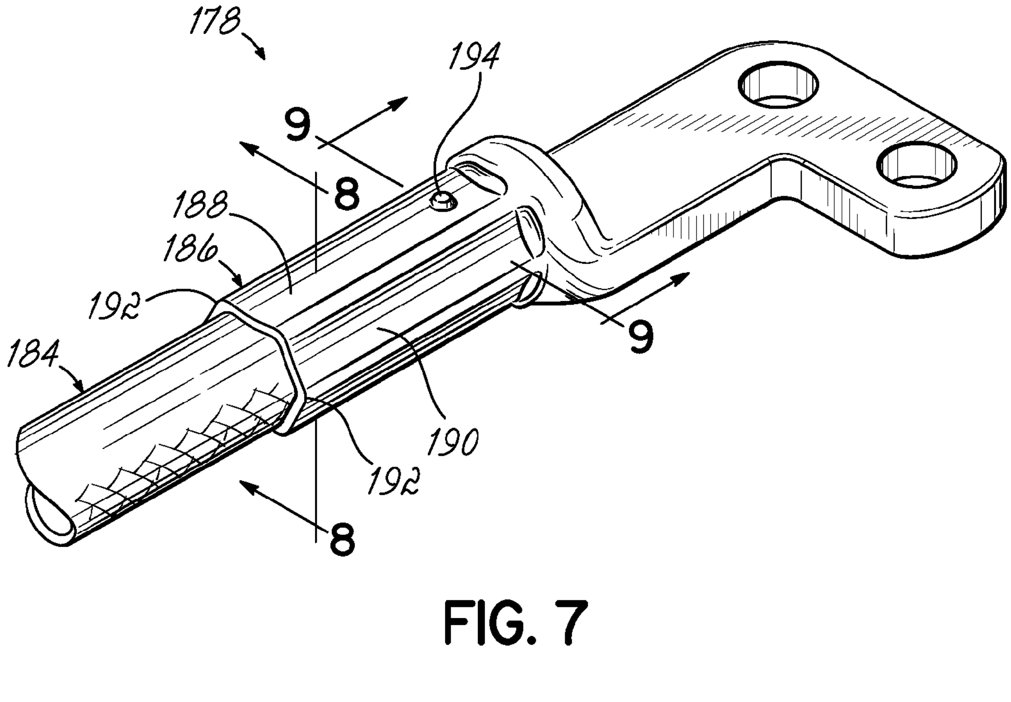
FIG. 7 illustrates an assembled and crimped embodiment of FIG. 4.

The assembly 178 is placed in a suitable crimping die, such as a modified hex crimping die 182 (FIG. 11), and crimped to make a cable 184 with a crimp 186. (FIG. 7). The crimp 186 comprises 2 opposing concave facets 188 and four straight facets 190. Between the facets are six corners 192. On one of the concave facets 188 is an indicator button 194. The indicator button 194 will be properly formed if the wire 20 was properly inserted and crimped. If the wire 20 was improperly inserted or crimped the indicator button 194 will be shaped improperly, indicating to a person or a visual inspection system that the particular cable 184 should be rejected. The indicator button 194 is formed by a recess (not shown) in crimping die 182. If the conductor strands 22 are not present in the proper position in the terminal 100, the receiving portion 102 will not extrude into the recess, and the indicator button 194 will not be formed.

Internally, as illustrated in FIG. 8, the conductor strands 20 are squeezed together tightly at 195 as compared to the visibly individual strands at 196 outside of the terminal 100. The sealing rings 146*a,b,c* are squeezed into the insulating sheath 24 to make a hydrostatic seal 198. The integral oxide breaker 158 is squeezed into the aluminum conductor strands 22 to give the assembly 178 a conductive electrical path 202 between the receiving portion 102 and the stranded aluminum wire 20.

Magnified examinations of sectioned cables 184 showed scrubbing action as the oxide breaker 158 penetrated the outside conductor strands 22 about 40% of their individual diameters. The protrusions 162 were seen to be buckled by compression, further increasing the scrubbing action that breaks the oxide.

Testing was conducted to verify the performance of the terminal with the integral oxide breaker 158 as follows:

Oxide Breaker testing: A smooth bore design was compared with a machined oxide breaker by testing. Results showed that the smooth bore did not meet the low initial 6.0 millivolt requirement whereas the machined oxide breaker barrel met the requirement with very good margin. Further testing after Thermal Shock and Current Cycling proved that the machined oxide breaker feature continued to perform well.

Thermal Shock testing: After the initial millivolt drop testing, a modified 100 cycle Thermal Shock test was run on the same set of 2/0 AWG Single-Hole Tensolite Aluminum Terminal samples. The temperature was cycled between −65° C. and +175° C. but no current flow was included in the testing. Millivolt drop results were tested at the end of the 100 cycles. The millivolt results after 100 cycles show that the terminals met the millivolt requirement of BPS-T-217 and the more stringent millivolt requirement of BPS-T-233.

Current Cycling testing: After Thermal Shock, a Current Cycling test was run on the same 2/0 AWG samples. A BPS-T-233 test method was used to evaluate the performance of the Tensolite 2/0 AWG single-hole terminals. Two assemblies were mounted in series with each of the four terminals attached to 7054-T4751 aluminum plates. Temperature verses current results showed all samples passed the 160 F degrees maximum and MV maximum drop.

Hydrostatic seal testing: The hydrostatic test used aluminum terminals crimped to wire and installed into a water filled chamber. The chamber was cycled 25 times from 0 to 80 PSI and held at pressure for 15 minutes each cycle. All samples passed.

Mechanical Strength of Crimp testing: All samples exceeded the 825-850 lb-Force target. The samples failed at the conductor and not in the crimp zone. Samples had previously gone through Thermal Shock and Current Cycling testing.

Consistent and Repeatable Length testing: Crimping of the 2/0 samples resulted in a consistent 0.10 inch length growth verses 0.25 to 0.38 inches for the bath tub crimp of the prior art.

Figure 12:
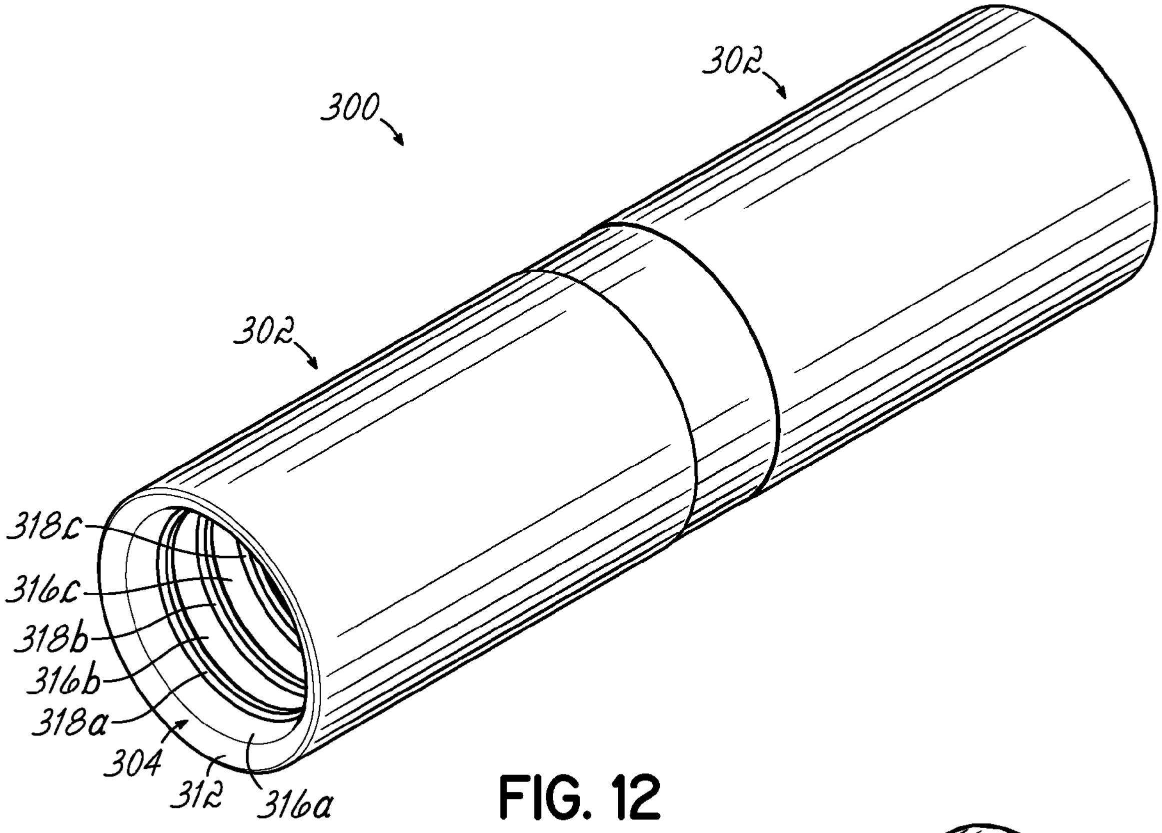
FIG. 12 is a perspective view of another alternative embodiment of the invention.
Figure 14:
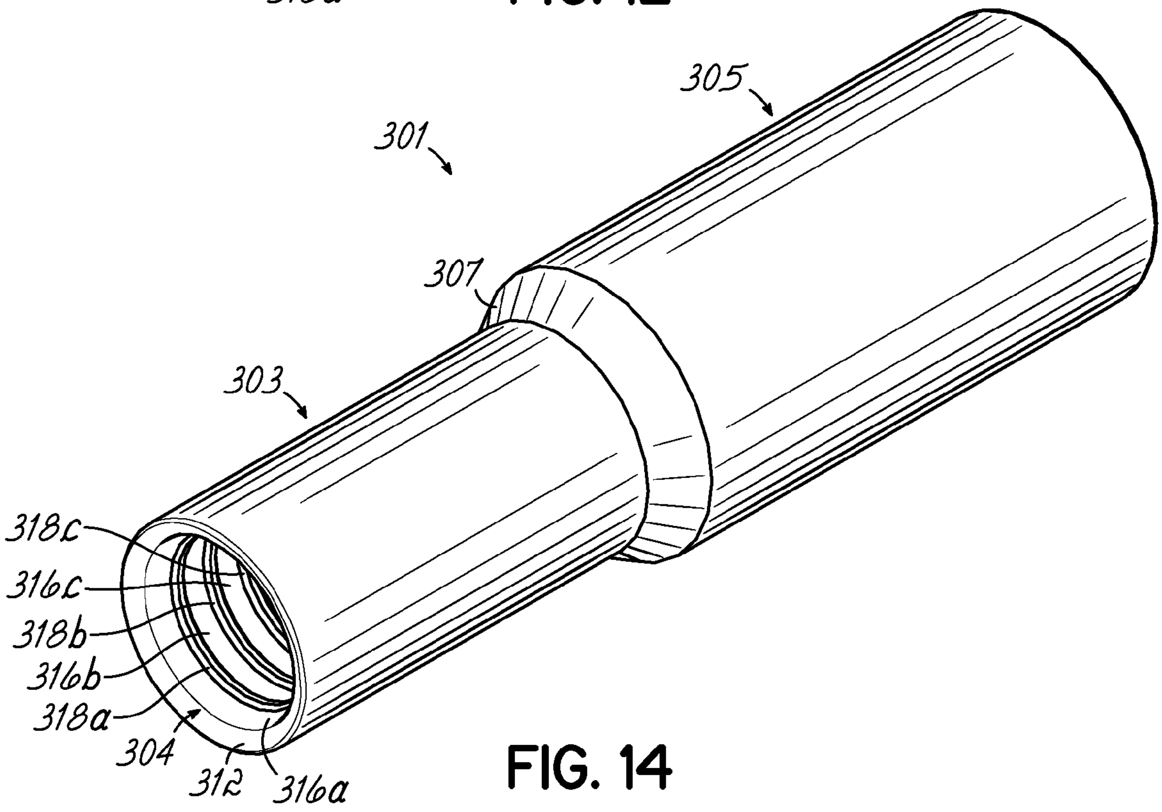
FIG. 14 is a perspective view of another alternative embodiment of the invention.
Figure 13:
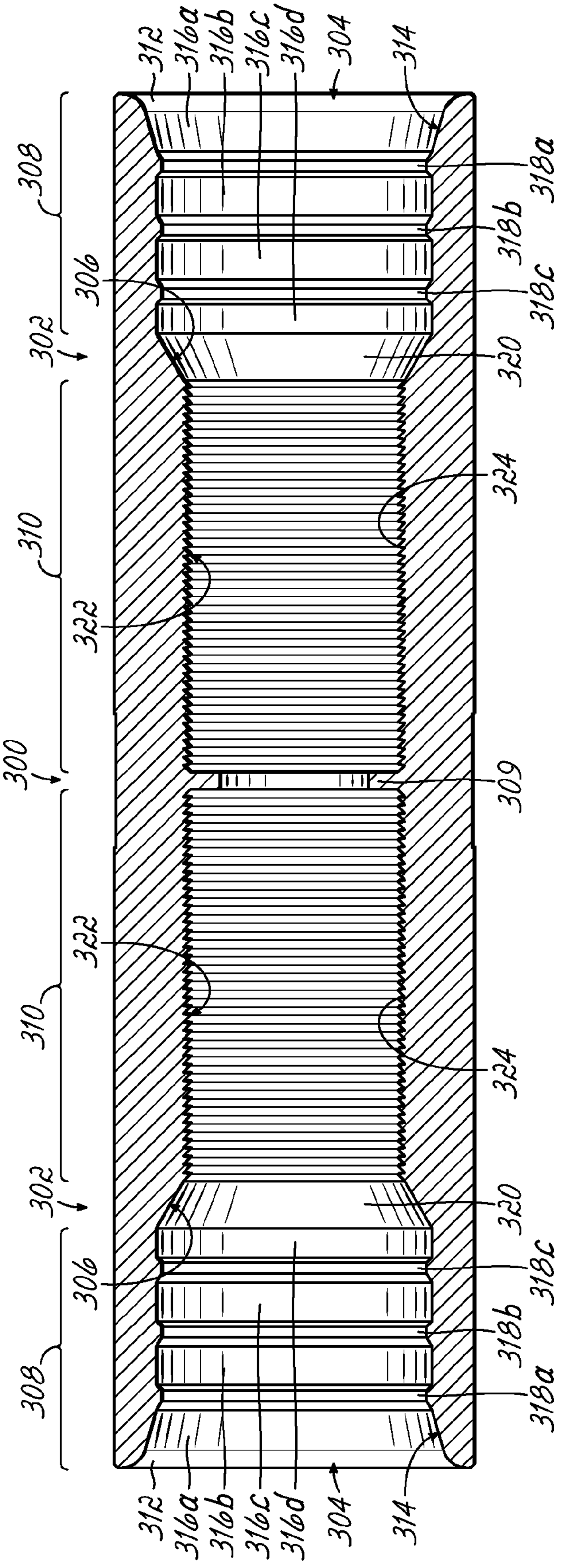
FIG. 13 is a cross-sectional view of the embodiment of FIG. 12.
Figure 15:
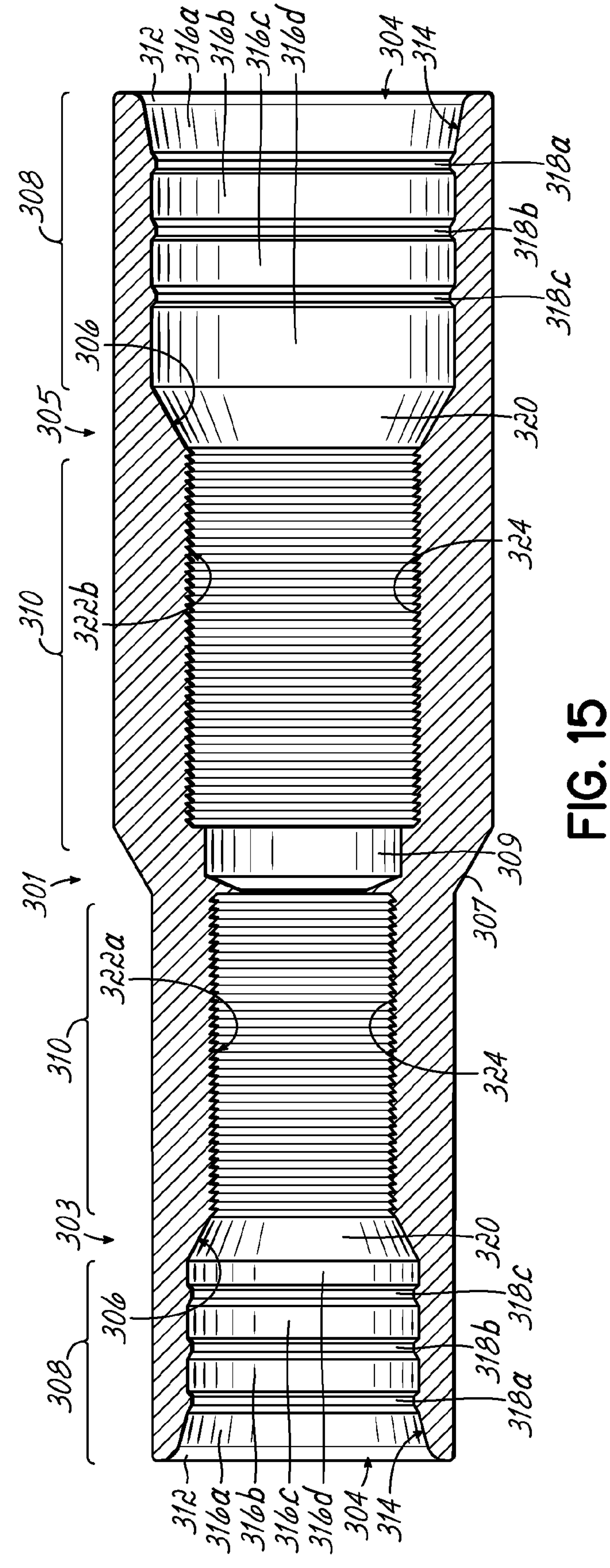
FIG. 15 is a cross-sectional view of the embodiment of FIG. 14.

FIGS. 12-16 illustrate further alternative embodiments of the invention in the form of a connector that might be implemented to connect together or splice together two conductors or wires. The connector may act as a splice connector to splice together two wires of the same size, or could be in the form of a transition connector to splice together two different size wires. FIGS. 12 and 13 illustrate a connector device or element wherein the two wires that are connected together or spliced together are generally of the same size or gauge, such as 1/0 to 1/0 size wires. Alternatively, FIGS. 14 and 15 illustrate the transition connector for connecting together wires having different gauges, such as a 1/0 to 2/0 size wire transition.

The connecters of FIGS. 12-16 may be used to connect wires of the same material, such as two aluminum or two copper wires, or may be used to connect together two different wires, such as an aluminum wire and a copper wire.

The connector embodiments share various features with the terminal embodiments discussed hereinabove. Specifically, the connector 300 of FIGS. 12 and 13 has a body formed of a suitable electrically conductive material, such as aluminum or copper. Connector 300 has two adjacent wire receiving portions 302 that are positioned at opposing ends of the body, and configured to receive the exposed end of a wire, such as an aluminum wire or a copper wire. Each receiving portion 302 forms a corresponding aperture 304 in the end of the connector like with the terminal embodiment. The receiving portion 302 might also be cylindrical, consistent with other embodiments, and the usual cylindrical shape of a wire, but the receiving portion might also be a variety of other shapes.

Figure 5A:
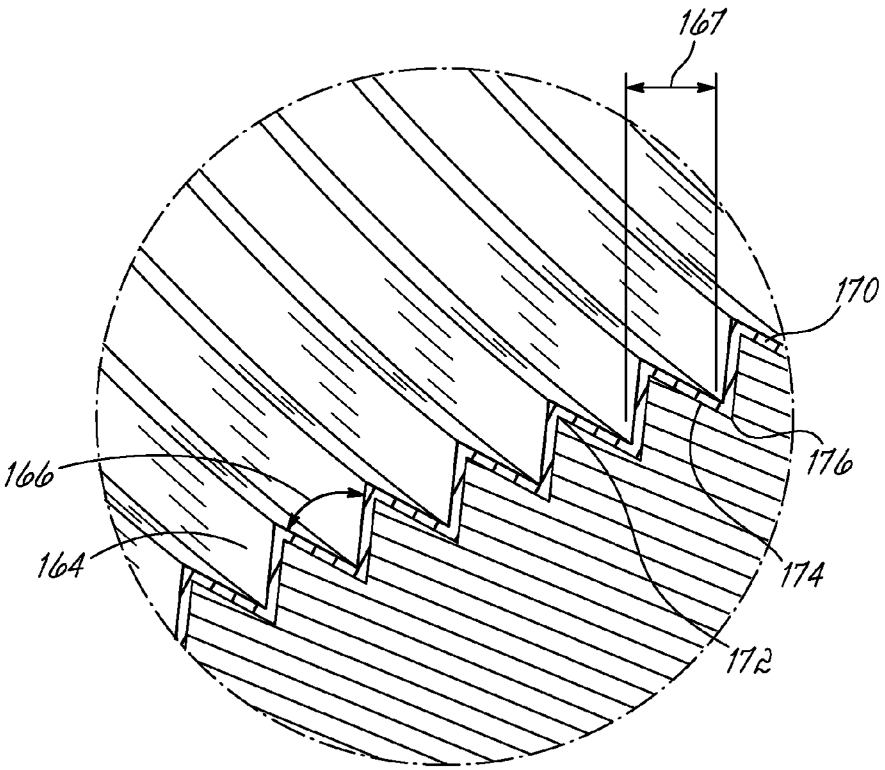
FIG. 5A is a detail view of the embodiment, as indicated in FIG. 5.
Figure 5B:
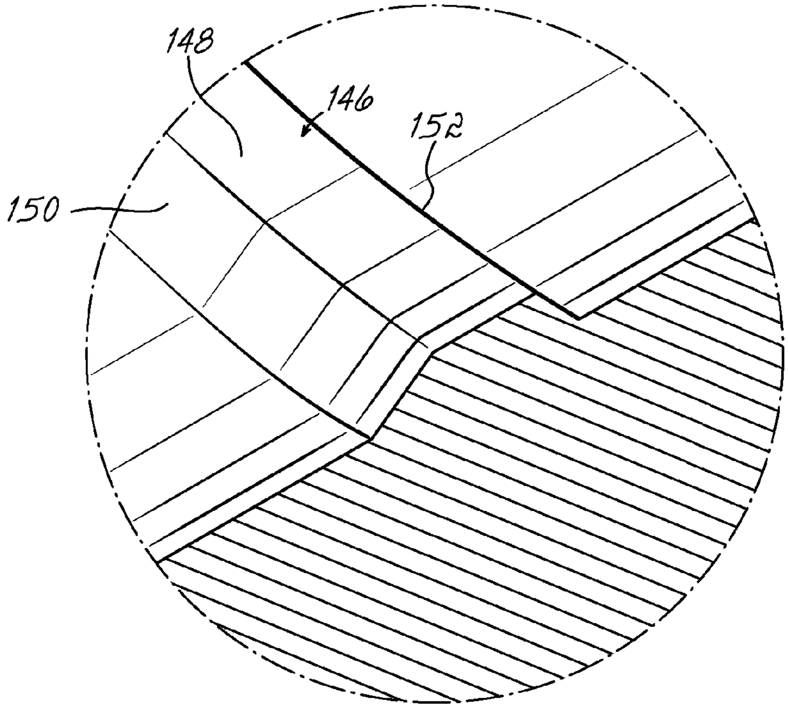
FIG. 5B is a detail view of the embodiment, as indicated in FIG. 5.
Figure 16:
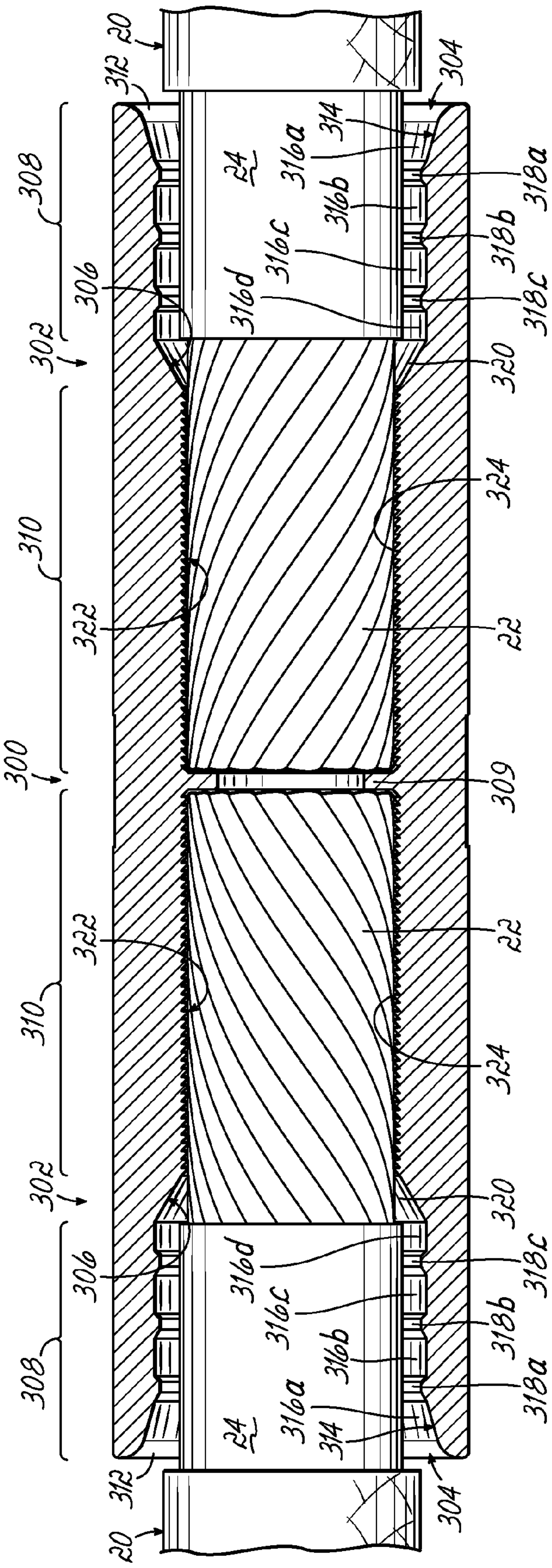
FIG. 16 illustrates a cross-sectional view of an embodiment of the connector of FIG. 12 showing two wires connected together.

Turning now to FIG. 13, each receiving portion 302 includes an interior wall 306 that forms a suitable portion to be crimped that includes a sealing portion 308 and a contact portion 310. A chamfer 312 transitions to surface 314 that forms the sealing portion 308. As in previously discussed embodiments, the seal zone of the sealing portion might be considered to be broken into a number of different areas 316*a*-316*d* by integral seal rings 318*a*-318*c* that protrude radially inwardly from surface 314. As noted, a greater or lesser number of areas 316 or seal rings 318 might be implemented in the embodiment of the invention than the three rings 318 and four areas 316 illustrated in the figures. Each seal ring 318*a*-318*c* will be constructed or configured as illustrated in FIG. 5*b* having suitable faces and angled walls, as noted herein. An integral transition area or funnel 320 feeds between the sealing portion 308 and the contact portion 310 to guide the conductor of a wire, as illustrated in FIG. 16, from a larger diameter sealed portion 308 to the smaller diameter contact portion.

As illustrated in FIG. 13, the contact portion also has a continuous inner surface 322, which has an oxide breaker element 324 formed thereon for breaking up the oxide layer on a conductor of a wire inserted into the connector 300. The integral oxide breaker element 324 may have a plurality of protrusions, such as tapered protrusions, such as those illustrated and discussed with respect to FIG. 5. The protrusions extend radially inwardly from the surface 322 in the contact position, and they include individually tapered protrusions or a helical thread, as illustrated in FIGS. 5-5A, or might take the form as illustrated in FIG. 10. In any case, the oxide breaker element 324 is suitably configured to engage a wire positioned in the contact portion, and the protrusion protrude into or penetrate into a conductor 22 of a wire when the receiving portion 302 is crimped. The oxide breaker element breaks up any oxide on the conductor, and also electrically engages the conductor for the purposes of conducting electrical current through the connector 300. While embodiments of the invention in the form of a terminal might conduct electricity to a particular point of a circuit, the embodiment of connector 300 is directed to form a suitable electrical connection, splice, or transition between the ends of two wires that are connected end-to-end, as illustrated in FIG. 16.

As discussed herein, the oxide breaker element might be a bare structure essentially presenting the metal of the connector 300 to the wire conductor. Alternatively, the oxide breaker element, and particularly the protrusions and structures of the oxide breaker element 324, might be coated with a suitable coating, similar to the coatings discussed herein above with respect to the terminal embodiment. Both of the oxide breaker elements of the connectors 300, 301 might be coated with a coating, or only one might be coated with the other one left uncoated.

As noted, FIGS. 12 and 13 illustrate a connector 300 for use with wires that are essentially the same size, diameter, or gauge, such as 1/0. FIGS. 14 and 15 illustrate an embodiment wherein the wires have a different gauge, such as a 1/0 to 2/0 transition. That is, connector 301, as illustrated in FIGS. 14 and 15, has one receiving portion 303 that is smaller than another receiving portion 305. To that end, the connector 301 provides a suitable splice and transition between differently-sized wires. The inner surface 322*a* of the contact portion 310 has a smaller inner diameter than the corresponding surface 322*b* in the adjacent wire receiving portion 305. All of the other elements of connector 301 are similar to those of connector 300, and thus, are set forth with similar reference numerals. For transition connector 301, an angled outer surface 307 indicates the transition between the different sizes. Of course, a structure having a uniform outside diameter, such as that shown by connector 300, might also be implemented with only the inner surface 322*a* being accordingly sized to its smaller size. Internally, between each of the receiving portions of the connectors 300 and 301, suitable wire stop structures 309, 311 are formed.

Turning now to FIG. 16, an appropriate connector 300, 301 might be utilized to connect together or splice together the ends of two wires similar to the way that the terminal 100 is connected to the end of a wire. The ends of the wire 20 are inserted into the terminal, and the conductor 22 is guided into the appropriate contact portion 310. The seal rings surround the insulation sheath 24 of the wire, while the oxide breaker 324 surrounds the conductor 22. The entire assembly can then be placed in a suitable crimping die and crimped so that the seal rings seal around the insulation sheath 24, and the oxide breaker element 324 presses into and engages the conductor 22. Not only will the oxide breaker 324 break any oxide layer on the conductor, but it will also protrude or dig into the metal or other material of the conductor to form a suitable electrical connection for the conductance of electrical current between the wires that are spliced together. The connectors 300, 301 are otherwise similar in operation and performance to the terminal 100 discussed herein.

The wires connected may be of the same material or of different materials. Also, as noted, both of the oxide breaker elements of a connector might be coated with a coating such as Nickel, or only one might be coated. For example, if an aluminum wire is spliced to a copper wire, only the receiving portion and oxide breaker element that engages the aluminum wire might be coated. Of course, if two aluminum wires are spliced, both oxide breaker elements might be coated, for example.

Figure 17:
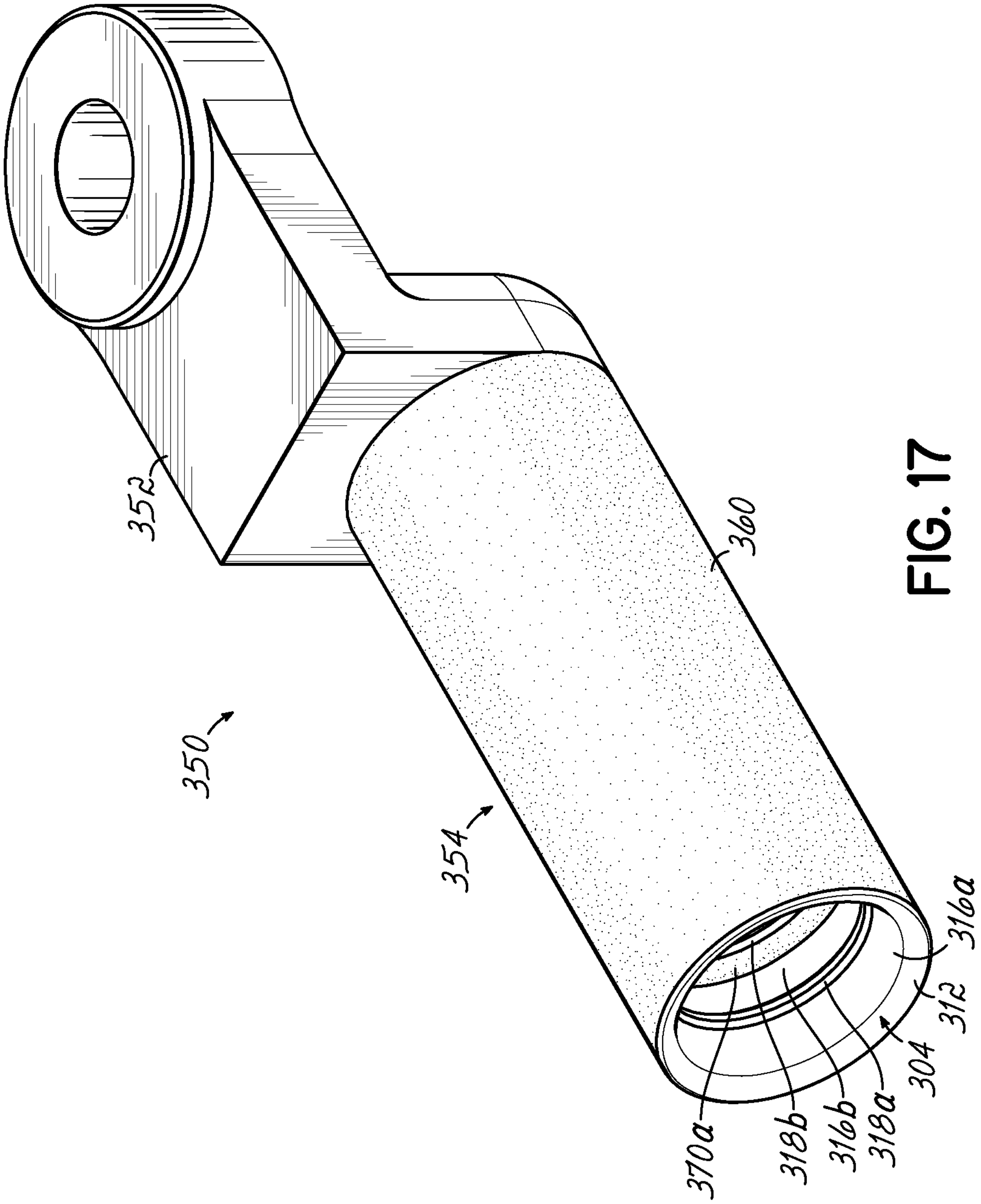
FIG. 17 is a perspective view of another alternative embodiment of the invention.

FIG. 17 illustrates another alternative embodiment of the invention incorporating a lubricant layer for the purposes of improved crimping of a connector or terminal of the invention. While a terminal embodiment is illustrated in FIG. 17, the features of the lubricant layer are equally applicable to the connector embodiments disclosed herein, such a those shown in FIGS. 12-16. Like reference numerals are used where applicable.

Figure 18:
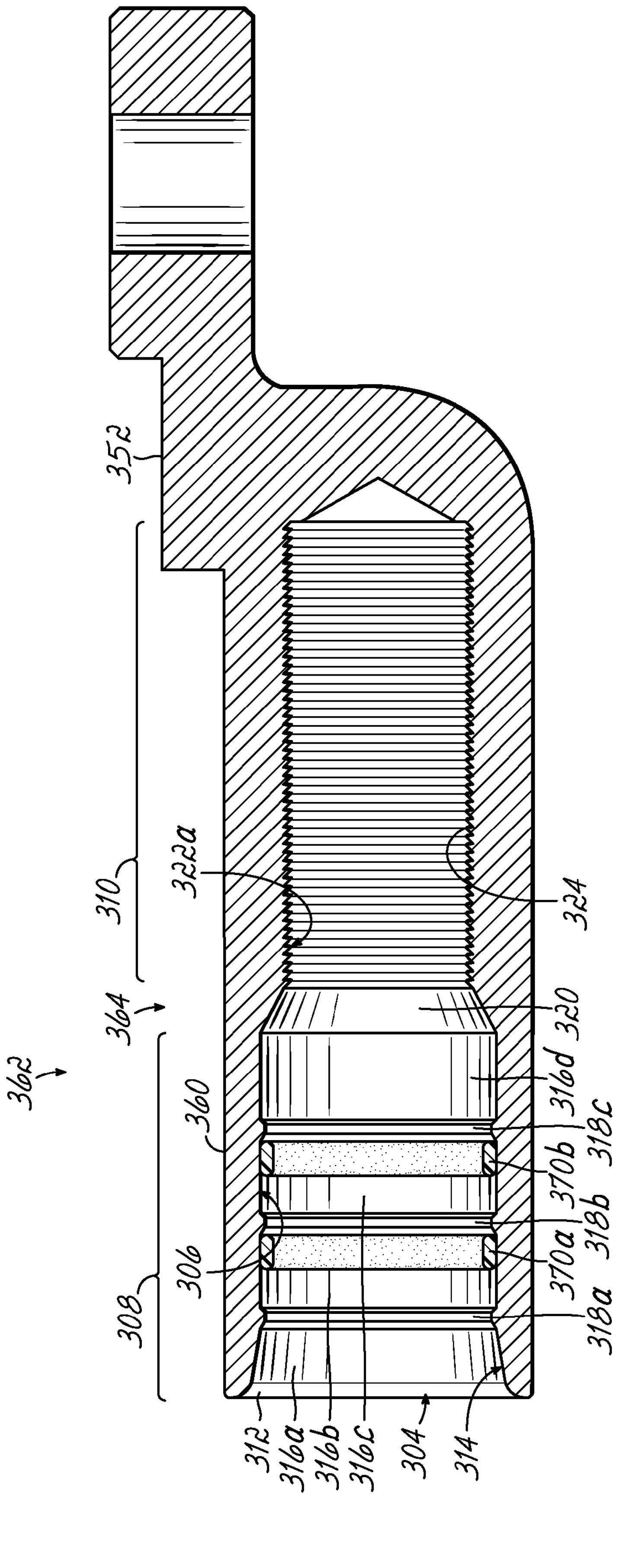
FIG. 18 is a perspective view of another alternative embodiment of the invention.

In accordance with one aspect of the invention, the terminal 350 includes a mount portion 352, which may be mounted to an appropriate surface, such as a grounding surface, when a wire or cable implementing terminal 350 is implemented. Terminal 350 also includes a wire receiving portion 354 constructed as discussed herein. For example, as illustrated in FIG. 18, the wire receiving portion will have an appropriate sealing portion 308 and contact portion 310. Each wire receiving portion 308 will include an aperture 304 with other appropriate structures positioned on an interior surface, including integral seal rings 318*a*-318*c*. To that end, the terminal 350 of FIG. 17 is similar to other terminals or connectors discussed herein in most of its construction, but also has a lubricant layer.

Figure 11:
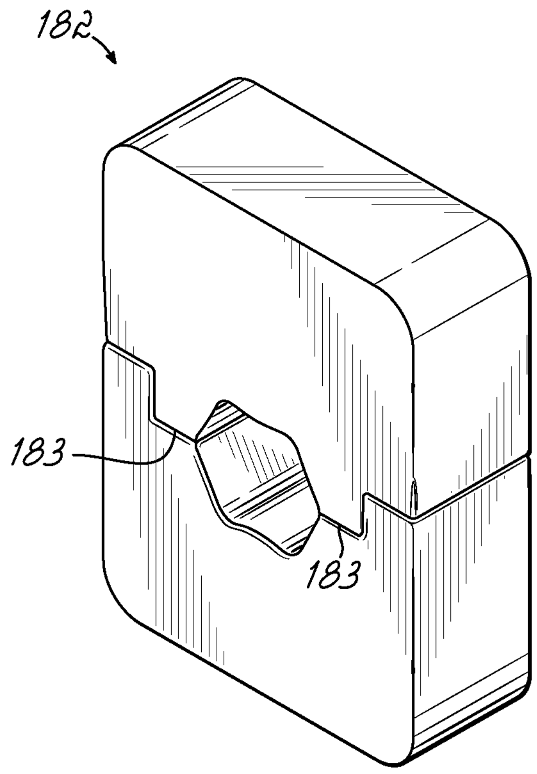
FIG. 11 is a perspective view of a die set used for crimping.

Generally, when a plating or coating of a material layer is provided, such as within the interior space of the wire receiving portion 354, the crimping process can be affected, sometimes detrimentally. In coating the interior surfaces, such as the oxide breaker element, the exterior surfaces of the device are also coated. Generally, when crimped, a majority percentage of the wire receiving portion 354 will be crimped as shown herein for capturing a wire conductor, and breaking up any oxide on the outer surface of the wire conductor. While certain coating materials flow over the outer surface of wire receiving portion 354 during the crimping process, other coating materials are harder and more brittle. In such cases, the coating material may extrude or flow into various crimp points of the die, such as the seams 183, as illustrated in FIG. 11. For example, while a coating of tin will sufficiently flow around the outside surface of the wire receiving portion 354 when it is crimped, a coating material layer of nickel, will not. When a hard material like nickel extrudes into the crimp seams 183 of the die during the crimping process, it will create flashing in the form of fins or wings at certain areas of the crimp. Such flashing may then pull away from the crimped terminal or connector, thus exposing the aluminum of the terminal or connector to corrosion. Generally, such a situation with flashing formed may be considered a failed crimp process.

In accordance with one aspect of the invention, the outside surface of the wire receiving portion is coated with a lubricant layer 360. The lubricant layer 360 is made of a suitable lubricant material, such as PTFE, such as FluoroPlate®-XK3-654-LT, available from Orion Industries of Chicago, Ill. The lubricant layer 360 is applied generally to the wire receiving portion 354, but only on the outside surface thereof. Other areas, such as the internal surfaces of the wire receiving portion 354, as well as the mount portion 352, are appropriately masked to prevent any overspray. The wire receiving portion 354 outside or external surface may be appropriately degreased while certain of the conductive areas are masked to be kept free from overspray. The lubricant material is applied on the outside surface of at least part of the wire receiving portion, such as in a thickness in the range of 0.0003-0.001 inches. In one particular embodiment, the thickness of the applied lubricant layer 360 may be 0.0006+/−0.0002 inches. The applied lubricant layer 360 may also be cured at around 160°+/−5° Fahrenheit, for around twenty minutes.

The lubricant layer 360 provides lubrication to a harder coating material, such as nickel, so that, during the crimp, the coating materials flow more easily in the die, and prevents undesirable flashing. In that way, the overall terminal or connector is improved, and failed crimps are minimized.

FIG. 18 illustrates another alternative embodiment, which has features which may be implemented in either a terminal or connector, as disclosed herein. FIG. 18 illustrates a terminal embodiment, but the features are equally applicable to a connector embodiment as well.

As illustrated in FIG. 18, the terminal 362 has an appropriate wire receiving portion 364, which is constructed as disclosed herein, including a sealing portion 308 and contact portion 310, with appropriate structures as shown. In accordance with another aspect of the invention, for enhancing the seal of a wire provided by sealing portion 308, flexible seal rings may be implemented along with the seal rings 318*a*-318*c*. Specifically, as illustrated in FIG. 18, one or more flexible seal rings 370*a*, 370*b* might be implemented in one or more of the areas 316*a*-316*d* that are provided between the seal rings 318 of the sealing portion 208.

For example, as illustrated in FIG. 18, flexible seal ring 370*a* is positioned between and adjacent to rings 318*a* and 318*b*, while flexible seal ring 370*b* is positioned between and adjacent to rings 318*b* and 318*c*. The flexible seal rings 370 are formed of a suitably flexible material, such as an RTV Silicone. One suitable material is Heat Resistant Sealant 736, available from Dow Corning. The flexible seal rings 370 are deposited in the appropriate spaces 316, and would generally take up less than the space or volume between the seal rings 318. Each of the flexible seal rings 370 is preferably formed continuously for 360° around the air surface of the sealing portion 308. An exact shape for the flexible seal rings 370 is not critical. The flexible seal rings 370*a* are flexed when the wire receiving portion 364 is crimped, as noted herein for forming a complete wire assembly or cable using an appropriate wire. The flexible seal rings 370 provide additional sealing to the overall seal that is provided by the crimping of the rings 318. In that way, an overall sealed environment within contact portion 310 is created and maintained.

In applying the flexible seal rings 370, a solvent wash might be utilized to wash the interior surfaces of the wire receiving portion 364. Using a high pressure dispenser with volumetric control, one or more 360° rings of sealant are applied. The flexible seal rings 370, in one embodiment, may be 50% higher than the height of the adjacent rigid seal rings 318. In another embodiment of the invention, the flexible seal rings 370 might be applied by hand, with a suitable tool to deposit material in the various areas 316, such as up to a level with the rings 316. The material applied is appropriately viscous, and can flow, but then hardens. Material may then be allowed to cure at room temperature, such as for a minimum of twenty-four hours, to provide the seal features of embodiments of the invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. An electrical terminal comprising:

a mount portion and a wire receiving portion formed of an electrically conductive material;

the wire receiving portion having a continuous interior wall and configured to be crimped and having an aperture to receive a wire, the wire receiving portion including a contact portion having an integral oxide breaker element and a sealing portion that is adjacent to and spaced from the contact portion toward the aperture;

the integral oxide breaker element including a plurality of protrusions that extend around the continuous interior wall and extend radially inwardly in the contact portion, the protrusions configured to engage a wire positioned in the contact portion and to protrude into the wire when the wire receiving portion is crimped;

a material layer coating formed on at least a portion of the integral oxide breaker element and made of a material different from the material of the integral oxide breaker element;

the sealing portion including at least one integral seal ring and at least one flexible seal ring adjacent to an integral seal ring for sealing the wire when the wire receiving portion is crimped.

2. The electrical terminal of claim 1 wherein the plurality of protrusions are tapered and extend from an interior wall of the contact portion with small ends of the tapered protrusions pointing toward a center axis of the wire receiving portion.

3. The electrical terminal of claim 1 wherein the plurality of protrusions are axial ridges having a longitudinal axis parallel to the center axis of the wire receiving portion.

4. The electrical terminal of claim 1 wherein the coating material includes at least one of nickel, electro nickel, gold, silver, tin, tin-lead or alkaline-bismuth-tin.

5. The electrical terminal of claim 1 wherein the oxide breaker element includes a helical thread.

6. The electrical terminal of claim 1 wherein the sealing portion includes a plurality of integral seal rings.

7. The electrical terminal of claim 1 wherein the electrically conductive material includes at least one of aluminum or copper.

8. The electrical terminal of claim 1 further comprising a lubricant layer applied on an outside surface of at least part of the wire receiving portion.

9. A cable comprising:

an electrical wire having a conductor and insulation;

an electrical terminal formed of an electrically conductive material having an aperture to receive a wire and including a crimp portion to be crimped to the electrical wire;

an oxide breaker element integrally formed in an annular wall of the crimp portion, the oxide breaker element including at least one protrusion configured to penetrate an outer layer of the conductor to make an electrical path with the wire when the electrical terminal is crimped to the wire;

a material layer coating formed on at least a portion of the oxide breaker element and made of a material different from the material of the oxide breaker element, the material layer penetrating the outer layer of the conductor; and at least one integral seal ring integrally formed in the annular wall of the crimp portion and spaced from the oxide breaker element and at least one flexible seal ring adjacent to an integral seal ring for sealing an end of the electrical terminal with the insulation when the electrical terminal is crimped.

10. An electrical connector for connecting electrical wires comprising:

a body formed of an electrically conductive material and including wire receiving portions positioned at opposing ends of the body;

each wire receiving portion having a continuous interior wall and configured to be crimped and having a respective aperture to receive a wire, the wire receiving portion including a contact portion having an integral oxide breaker element and a sealing portion that is adjacent to and spaced from the contact portion toward the respective aperture;

at least one of the integral oxide breaker elements of a wire receiving portion including a plurality of protrusions that extend around the continuous interior wall and extend radially inwardly in the contact portion, the protrusions configured to engage a wire positioned in the contact portion and to protrude into the wire when the wire receiving portion is crimped;

a material layer coating formed on at least a portion of at least one of the oxide breaker elements and made of a material different from the material of the at least one oxide breaker element;

the sealing portion of at least one wire receiving portion including at least one integral seal ring and at least one flexible seal ring adjacent to an integral seal ring for sealing the wire when the wire receiving portion is crimped.

11. The electrical connector of claim 10 wherein the plurality of protrusions are tapered and extend from an interior wall of the contact portion with small ends of the tapered protrusions pointing toward a center axis of the wire receiving portion.

12. The electrical connector of claim 10 wherein the plurality of protrusions are axial ridges having a longitudinal axis parallel to the center axis of the wire receiving portion.

13. The electrical connector of claim 10 wherein the coating material includes at least one of nickel, electro nickel, gold, silver, tin, tin-lead or alkaline-bismuth-tin.

14. The electrical connector of claim 10 wherein the oxide breaker element includes a helical thread.

15. The electrical connector of claim 10 wherein the sealing portion includes a plurality of integral seal rings.

16. The electrical connector of claim 10 wherein the electrically conductive material includes at least one of aluminum or copper.

17. The electrical connector of claim 10 wherein one of the wire receiving portions has an inner diameter that is smaller than an inner diameter of the other wire receiving portion for connecting electrical wires having different sizes.

18. The electrical connector of claim 10 further comprising a lubricant layer applied on an outside surface of at least part of a wire receiving portion.

19. A cable comprising:

a plurality of electrical wires, each wire having a conductor and insulation;

a connector formed of an electrically conductive material and configured to connect the plurality of wires together, the connector including wire receiving portions positioned at opposing ends of the connector for receiving a conductor and insulation of a respective electrical wire;

each wire receiving portion of the connector having a continuous interior wall and configured to be crimped onto the respective electrical wire and having a respective aperture to receive a respective wire, each wire receiving portion including a contact portion having an integral oxide breaker element and a sealing portion that is adjacent to and spaced from the contact portion toward the respective aperture;

at least one of the integral oxide breaker elements of a wire receiving portion including a plurality of protrusions that extend around the continuous interior wall and extend radially inwardly in the contact portion, the protrusions configured to engage a wire positioned in the contact portion and to protrude into the wire conductor when the wire receiving portion is crimped;

a material layer coating formed on at least a portion of at least one of the oxide breaker elements and made of a material different from the material of the at least one oxide breaker element;

the sealing portion of at least one wire receiving portion including at least one integral seal ring and at least one flexible seal ring adjacent to an integral seal ring for sealing against the wire insulation when the wire receiving portion is crimped.

20. An electrical terminal comprising:

a mount portion and a wire receiving portion formed of an electrically conductive material;

the wire receiving portion configured to be crimped and having an aperture to receive a wire and including a contact portion having an integral oxide breaker element and a sealing portion that is adjacent to and spaced from the contact portion toward the aperture;

the integral oxide breaker element including a plurality of protrusions that extend radially inwardly in the contact portion, the protrusions configured to engage a wire positioned in the contact portion and to protrude into the wire when the wire receiving portion is crimped;

the sealing portion including at least one integral seal ring and at least one flexible seal ring adjacent to the integral seal ring for sealing the wire when the wire receiving portion is crimped.

21. An electrical connector for connecting electrical wires comprising:

a body formed of an electrically conductive material and including wire receiving portions positioned at opposing ends of the body;

each wire receiving portion configured to be crimped and having a respective aperture to receive a wire and including a contact portion having an integral oxide breaker element and a sealing portion that is adjacent to and spaced from the contact portion toward the respective aperture;

at least one of the integral oxide breaker elements of a wire receiving portion including a plurality of protrusions that extend radially inwardly in the contact portion, the protrusions configured to engage a wire positioned in the contact portion and to protrude into the wire when the wire receiving portion is crimped;

the sealing portion of at least one wire receiving portion including at least one integral seal ring and at least one flexible seal ring adjacent to the integral seal ring for sealing the wire when the wire receiving portion is crimped.

* * * * *